United States Patent [19]

Villas

[11] Patent Number: 4,810,145
[45] Date of Patent: Mar. 7, 1989

[54] RETRACTABLE AND REUSABLE SELF-LOCKING FASTENER

[76] Inventor: Hugo J. Villas, 37 Nelson St., Harrington Park, N.J. 07640

[21] Appl. No.: 89,826

[22] Filed: Aug. 28, 1987

Related U.S. Application Data

[63] Continuation-in-part of Ser. No. 898,205, Aug. 20, 1986, abandoned.

[51] Int. Cl.$^4$ ............................................. F16B 39/34
[52] U.S. Cl. ................................... 411/206; 411/508;
411/525; 411/913; 403/408.1; 403/316; 29/401.1; 29/509; 29/522.1
[58] Field of Search ............... 411/508, 204, 206, 509, 411/340, 207, 913, 519, 525, 526; 29/401.1, 509, 522 A; 403/408.1, 316

[56] References Cited

U.S. PATENT DOCUMENTS

| | | | |
|---|---|---|---|
| 732,245 | 6/1903 | Weiss . | |
| 1,788,750 | 1/1931 | Snyder . | |
| 1,801,846 | 0/1931 | Campbell . | |
| 1,869,947 | 8/1932 | Shook . | |
| 2,133,871 | 10/1938 | Reed | 287/126 |
| 2,276,050 | 3/1942 | Leighton | 29/509 |
| 2,408,340 | 9/1946 | Poupitch | 85/40 |
| 2,616,327 | 11/1952 | Karitzky | 85/3 |
| 2,758,498 | 8/1956 | Johnson | 85/5 |
| 2,798,748 | 7/1957 | Maurer | 411/519 X |
| 2,933,970 | 4/1960 | Pagano | 85/8.8 |
| 3,077,809 | 2/1963 | Harding et al. | 85/2.4 |
| 3,135,043 | 6/1964 | Anderson et al. | 29/270 |
| 3,665,800 | 5/1972 | Ryder | 411/508 X |
| 3,777,052 | 12/1973 | Fegen | 174/138 D |
| 4,083,162 | 4/1978 | Regan et al. | 411/913 X |
| 4,354,298 | 10/1982 | Tanaka et al. | 24/201 |
| 4,372,015 | 2/1983 | Rhoton | 24/221 R |
| 4,373,825 | 2/1983 | Inamoto et al. | 403/14 |

FOREIGN PATENT DOCUMENTS

| | | | |
|---|---|---|---|
| 1400784 | 11/1968 | Fed. Rep. of Germany | 411/519 |
| 2834200 | 2/1980 | Fed. Rep. of Germany | 411/508 |
| 1352322 | 5/1974 | United Kingdom | 411/508 |

*Primary Examiner*—Lloyd A. Gall
*Assistant Examiner*—Curtis B. Brueske
*Attorney, Agent, or Firm*—J. Herman Yount, Jr.

[57] ABSTRACT

A retractable and reusable self-locking fastening device in the form of a commercially available rivet, pin, threaded bolt or stud and the like for insertion into a sized clearance hole in a workpiece includes a shank means having tenon and pilot means which comprises two successive steps of lesser diameter formed on at least one end of the shank means. Mounted on and fixedly connected to the pilot means is a lug means having a generally truncated conical shape with one closed end and the end remote therefrom being opened to define a space in which the tenon means is disposed, and a sized aperture in the closed end to enable the lug means to be fixedly connected to the pilot means. The tapered walls of the lug means have at least four outwardly extending movable sections separated by at least four longitudinal slots defining a truncated cone configuration. The lug means is made from any suitable material which possesses sufficient resiliency to permit the movable sections to be compressed during insertion of the fastener into the sized clearance hole in the workpiece to be secured or fastened. The retractable and reusable self-locking fastener as above described may be threaded inwardly of the tenon means and pilot means, and provides a nut means which is operative to secure a workpiece or workpieces against a fixed shoulder and lug means to prevent said nut means from turning off said fastener.

19 Claims, 2 Drawing Sheets

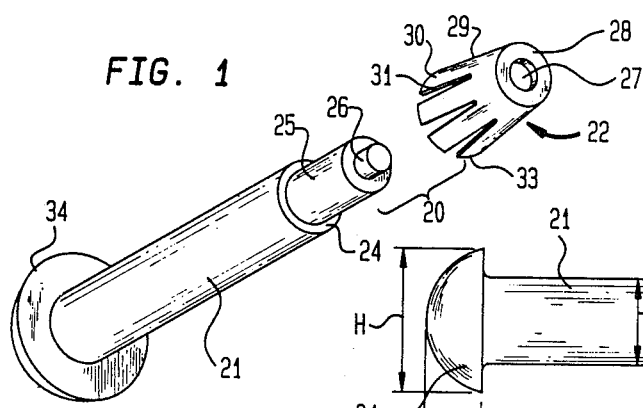
FIG. 1
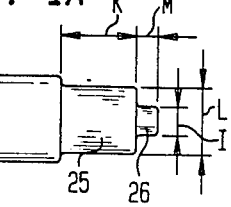
FIG. 1A
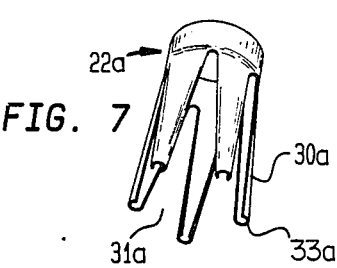
FIG. 2
FIG. 7
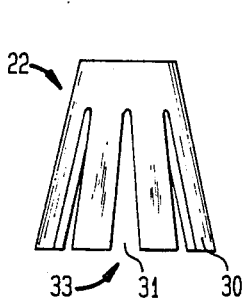
FIG. 3
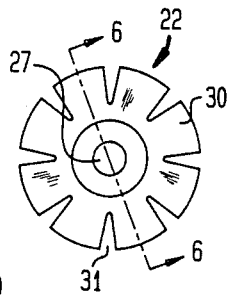
FIG. 4
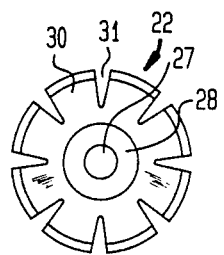
FIG. 5
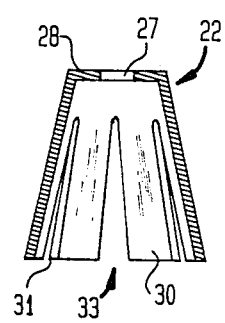
FIG. 6
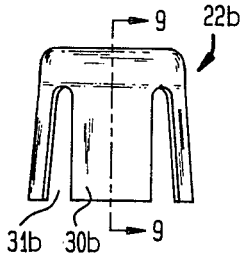
FIG. 8
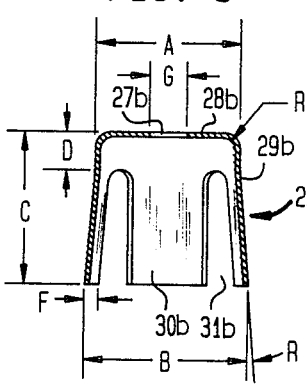
FIG. 9
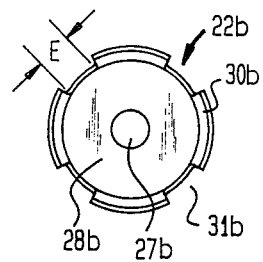
FIG. 10

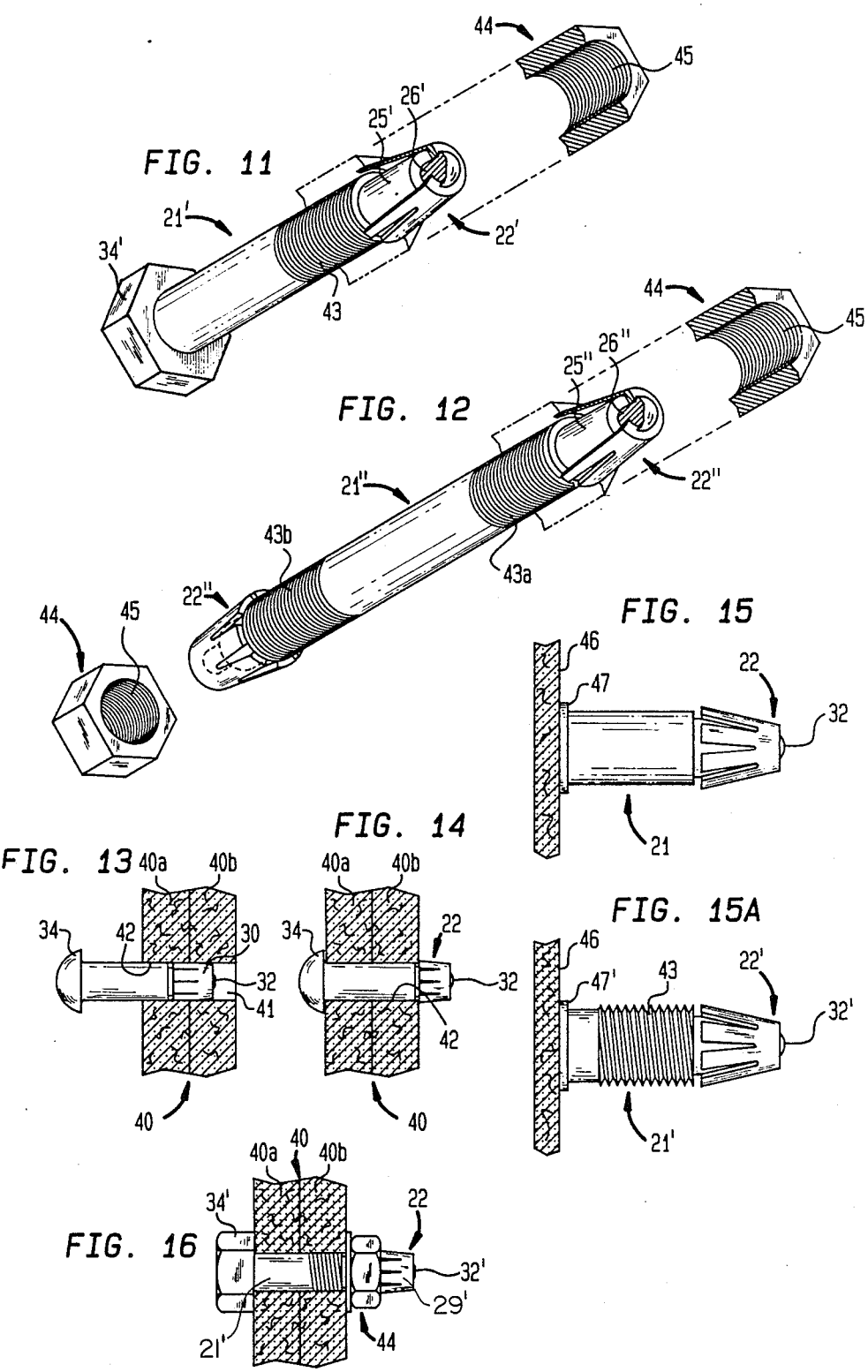

RETRACTABLE AND REUSABLE SELF-LOCKING FASTENER

This is a continuation-in-part of application Ser. No. 898,205, filed Aug. 20, 1986, now abandoned.

BACKGROUND OF THE INVENTION

This invention relates generally to fastening devices such as rivets, pins, threaded bolts and studs on which standards have been promulgated and which are used for locking, positioning, or entrapping plates or the like and more particularly to fastening devices as above enumerated which are self-locking, retractable, and reusable.

Fastening devices and/or fasteners when used herein are intended to mean rivets, pins, threaded bolts and studs on which standards for the clearance hole sizes for a given shank size have been promulgated either by commercial manufacturers and sellers of such fastening devices such as Acme Rivet Co., of Bristol, Conn.; SPS Technology Co., of Jenkinstown, Pa., and others or in the case of metric threaded fastening devices nationally by the Industrial Fastener Institute, of Cleveland, Ohio.

Since clearance hole size affects the available underhead bearing surface of area and hence the strength and performance of both the fastening device and the joint made with an associated member, plate, wall, and the like being locked, positioned or entrapped, "clearing hole", "sized clearing hole", "sized clearance hole" and the like expressions when used herein are intended to mean the said clearing hole standards so promulgated for fastening devices.

These definitions are best illustrated by reference to the following table taken from the above-mentioned sources.

CLEARANCE HOLE DIMENSIONS AND TOLERANCES FOR FASTENING DEVICES SUCH AS RIVETS, PINS, THREADED BOLTS AND STUDS WHERE SHANK "A" REPRESENTS THE DIAMETER OF THE BODY OF A GIVEN FASTENING DEVICE

| Nominal Size | Shank "A" Max./Min. | Recommended Clearance Hole Size | | |
|---|---|---|---|---|
| | | Rivets Max./Min. | Pins Max./Min. | Blts & St'ds Max./Min. |
| ⅛"—.125 | .123–.118 | .128–.125 | .127–.124 | .136–.130 |
| 3/16"—.188 | .186–.181 | .196–.191 | .191–.187 | .209–.199 |
| ¼"—.250 | .248–.243 | .265–.260 | .253–.249 | .286–.276 |
| 5/16—.313 | .311–.306 | .328–.323 | .316–.312 | .349–.339 |
| ⅜—.375 | .373–.368 | .390–.385 | .378–.374 | .441–.401 |
| 7/16—.438 | .436–.431 | .453–.448 | .441–.437 | .475–.465 |
| ½—.500 | .496–.491 | .516–.510 | .504–.499 | .536–.526 |

(Clearance hole dimensions for components; NOT for mating parts i.e., threaded hole or nut)

There are of course known types of fastening devices in the prior art as is shown by U.S. Pat. Nos. 2,408,340 and 2,758,498 which are hollow shank fastening devices as distinguished from the solid shank fastening devices contemplated by the disclosure in the present application. In practice, these prior art fastening devices do not provide the relatively high degree of strength and compressive forces often required for industrial, commercial and even consumer used. This deficiency stems primarily from the structural limitations embodied in the design concepts of these prior art devices. Additionally, these prior art devices due to their complex structures are expensive to manufacture.

By modifying the configuration of the known commercially available fastening devices, the present invention provides improved fastening devices which are not only retractable and reusable but additionally provide a "self-locking" feature. This improved structure is accomplished without changing the character of the original fastening device and more importantly without requiring changes in the standards for the sized clearance hole required for a given type of solid shank fastening device.

The design characteristics of the improved fastening devices in accordance with the present invention lend themselves to very inexpensive mass production methods such as Cold-Forming, Progressive Die Stamping, and Robotic Assembly.

Further, the design of the improved fastening device in accordance with the present invention can be modified in various ways as is shown by the embodiments as hereinafter described in order to permit the use of these improved fastening devices for many applications. In particular, the improved fastening device is intended for use in mass production, high volume industries manufacturing products such as Automobiles, small and large, industrial, commercial and residential appliances, and the like types of products where it is desirable and beneficial to reduce costs and expenses of manufacturing these products and to avoid the secondary procedures of clinching the fastening devices or terminating the shanks of the particular fastening device by use of retaining rings, cotter pins, lock nuts, swaging, etc.

SUMMARY OF THE INVENTION

Thus, the present invention covers a retractable and reusable self-locking fastener for insertion into a sized clearance hole in a workpiece having, shank means, tenon means formed on one end of said shank means and having a diameter less than the diameter of said shank means, pilot means formed on the end of said tenon means, lug means sized in relation to the dimensions of the shank and tenon and being fixedly connected to the pilot means, said lug means having outwardly extending movable sections which can be compressed to a diameter less than that of the shank means.

Additionally, as in the case of a threaded bolt or stud, the shank can be threaded inwardly of the end having the tenon means and the pilot means for operative association with a nut means so that the workpiece is engaged between the fixed shoulder nd the nut means where the lug means will prevent the nut from backing off of the threaded shank. The shank means can also be provided with tenon means and pilot means at both ends thereof together with threads formed on at least one end of the shank means, as in a double ended stud.

Accordingly, it is the object of the present invention to provide a simply structured self-locking fastener which is retractable and reusable.

It is another object of the present invention to provide a simple structured self-locking fastener which is relatively inexpensive to manufacture.

It is another object of the present invention to provide a simple structured self-locking fastener which can be utilized for a number of applications, ranging from the mere positioning of a workpiece to securely locking a workpiece.

It is yet another object of the present invention to provide a simply structured self-locking fastener which is readily usable in a heavy industrial setting.

It is yet another object of the present invention to provide a simply structured self-locking fastener which can be removed from a workpiece without damaging the same.

It is yet another object of the present invention to provide a simply structured self-locking fastener having a tenon and pilot structure and lug means which can be structurally modified in accordance with the desired application.

It is yet another object of the present invention to provide a simply structured self-locking fastener having a shank means which is threaded at a predetermined section so as to receive a nut means to facilitate in securely engaging a workpiece.

It is yet another object of the present invention to provide a simply structured self-locking fastener having a tenon and pilot structure and lug means at both ends of a shank means, which is threaded at at least one end for operative association with a nut means.

It is a still further object of the present invention to provide a simply structured self-locking fastener having a two piece assembly of dissimilar materials where side thrust loading is not a major consideration; and which is easily removable for reuse without damage to the associated workpiece in which the fastener is affixed.

These and other objects will become apparent, as will a better understanding of the concepts underlying the present invention, by reference to the description which follows taken with the drawings in which:

DESCRIPTION OF THE DRAWINGS

FIG. 1 is a perspective view of one embodiment of the retractable and reusable fastener before the lug means is fixedly connected to the pilot structure where the shank means is a standard metal rivet.

FIG. 1A is a side view of the fastener shown in FIG. 1 and having character letters representing the critical dimensions thereof for reference to Tables 3 and 4 shown in the description below.

FIG. 2 is a perspective view of the fastener shown in FIG. 1 after the lug means has been fixed to the pilot structure partly broken away in vertical cross-section.

FIG. 3 is a side view of the lug means shown in FIG. 1.

FIG. 4 is a top view of the lug means shown in FIG. 1.

FIG. 5 is a bottom view of the lug means shown in FIG. 1.

FIG. 6 is a vertical cross-section taken on lines 6—6 of FIG. 4.

FIG. 7 is a bottom view of another form of the lug means in accordance with the present invention.

FIG. 8 is a side view of yet another form of the lug means in accordance with the present invention.

FIG. 9 is a vertical cross-section taken on line 9—9 of FIG. 8 having characters representing the critical dimensions referred to in Tables 1 and 2.

FIG. 10 is a bottom view of the lug means shown in FIG. 8 and having characters representing the critical dimensions dimensions referred to in Tables 1 and 2.

FIG. 11 is a partially broken away perspective view of a second embodiment of the present invention where the shank means is threaded to receive a nut (a standard threaded bolt).

FIG. 12 is a partially broken away perspective view of a third embodiment of the present invention where the shank means has pilot and tenon means at both ends as well as being threaded (a standard double ended threaded stud).

FIG. 13 is a side view of the Rivet fastener shown in FIG. 2 being inserted through aligned openings into plates.

FIG. 14 is a side view of the fastener shown in FIG. 13 after insertion is complete and the two plates are secured together.

FIG. 15 is a side view of the fastener made in accordance with the present invention where the end remote from the pilot and tenon means is fixedly connected to a base member (a welded pin).

FIG. 15A is a side view of the fastener made in accordance with the second embodiment of the present invention where the end remote from the pilot and tenon means is fixedly connected to a base member.

FIG. 16 is a side view of the fastener made in accordance with the second embodiment of the present invention and in assembled position where the lug means retains the nut means on the shank means.

DESCRIPTION OF THE FIRST EMBODIMENT

Referring to the drawings, FIGS. 1–6 illustrate one embodiment of the retractable and reusable self-locking fastener generally designated as 20 in accordance with the present invention. FIGS. 13, 14 and 16 show fastener 20 being inserted through workpiece 40 so as to lock, position or entrap said workpiece when in assembled position.

The remaining FIGURES illustrate various modifications of the first embodiment which can be made without departing from the spirit and scope of the present invention.

In the interest of clarity and consistency, the numerical characters utilized throughout the FIGURES are the same for similar elements regardless of the different embodiments illustrated.

The shank means 21 of fastener 20 is cylindrical in shape and is made from any suitable material having the requisite mechanical properties such as strength and hardness. The choice of material will range from a high grade plastic to stainless steel stock, depending upon the application for which fastener 20 is being employed.

As shown in FIG. 1, shank means 21 includes at one end as at 24 tenon means 25 which is formed by turning down a predetermined length of shank means 21 by any suitable means such as a cold heading process or a conventional lathe operation. Thus, tenon means 25 is a cylindrically shaped projection of predetermined length having a predetermined diameter which is less than the diameter of shank means 21. It should be appreciated that the length and diameter of tenon means 25 are determined with respect to the particular application for which fastener 20 will be used. This relationship will become more apparent from the description which follows below.

Integrally formed on tenon means 25 is pilot means 26 which may have any suitable shape, but is preferably cylindrical in shape so that it can be cold formed simultaneously with the tenon or a turning operation similar to that utilized to form tenon means 25 can be employed. The length of pilot means 26 is dependent upon the means employed to operatively affix lug means 22 to said pilot means 26.

At the end remote from the tenon and pilot structure, shank means 21 provides a fixed shoulder 34 which can take the form of a flange, semi-sphere or other suitable shape which will facilitate in locking, maintaining and positioning the fastener and workpiece 40. The precise structure of fixed shoulder 34 will vary to accomodate different workpieces and to accomplish any specifically desired results.

Shank means 21 need not provide fixed shoulder 34 in applications where the end remote from the tenon and pilot structure can be welded or otherwise affixed to a plate 46 or other structure on which the fastener is to be maintained, locked, or positioned, as is shown in FIG. 15 in which a weld is indicated by the reference numeral 47.

The lug means 22 depicted in FIGS. 3-10 is provided for operative association with tenon means 25 and pilot means 26. Lug means 22 is made from a material which is resilient yet possesses high mechanical properties such as yield strength and hardness. Such materials include high carbon steel, stainless steel, titanium and beryllium-copper. Certain resilient plastics may even be employed, particularly for lighter applications.

As shown in FIGS. 2-6, lug means 22 has a generally truncated conical shape which defines a cup-like structure having skirt means 29 and being closed at end 28 where the diameter of lug means 22 is smallest.

The diameter of closed end 28 is determined with respect to the diameter of tenon means 25, and in most applications said inside diameters will be substantially equal to one another. Further, the length of lug means 22 will be slightly less than the length of tenon means 25.

On the longitudinal axis of closed end 28, an opening 27 is provided for communication with pilot means 26 so that lug means 22 can be guidedly mounted on tenon means 25. In order to provide a mated fit, opening 27 is sized according to the dimensions of pilot means 26 and is of the same cross-sectional shape as that of pilot means 26, as shown in FIG. 2. As noted above, the cross-sectional shape is preferably circular.

Lug means 22 is operatively affixed to pilot means 26 in any suitable manner once lug means 22 is properly mounted over tenon means 25. Preferably, the material from which pilot means 26 is made is sufficiently malleable so that the portion of pilot means 26 which extends beyond the closed end 28 of lug means 22 can be forcibly "mushroomed" in a radially outward direction as shown at 32 in FIG. 2.

Lug means 22, as shown in FIGS. 3, 5 and 6, further provides at least four outwardly extending movable sections 30 which are longitudinally disposed on skirt means 29 beginning at a predetermined distance below closed end 28. This predetermined distance will depend upon the resiliency of the material used, the length of lug means 22, and the diameter of shank means 21 which must be greater than the diameter to which lug means 22 can be compressed. Longitudinally disposed between movable sections 30 are slots 31, which are preferably tapered towards closed end 28 so as to facilitate in compressing movable sections 30 at open end 33. Preferably, longitudinal slots 31 are diametrically opposed from one another, as is clear from FIGS. 5 and 10.

As is evident from FIGS. 3-10, lug means 22 can vary in structure with regard to the number of movable sections 30 which are provided and the shape thereof. These variations are implemented to permit the present invention to be utilized effectively in a multitude of applications, each of which may have different requirements.

In particular, FIG. 7 shows lug means 22a with movable sections 30a which are acutely tapered so that the material used to make lug means 22a need not be as resilient as that used to make the lug means 22a illustrated in FIG. 6. FIG. 7 further shows movable sections 30a (having slots 31a therebetween) to be acutely arcuate at open end 33a so that movable sections 30a will engage workpiece 40 at a radial distance further from the longitudinal axis if shank means 21 than that of the lug means shown in previous FIGURES. The positioning of the bearing surfaces in accordance with lug means 22a as illustrated in FIG. 7 maximizes the mechanical properties of the material used during compression loading.

FIGS. 8-10 show another form of lug means 22b where four movable sections 30b are provided and where the diameter at open end 33b is not considerably greater than the diameter at closed end 28b, thus lug means 22b is of a relatively short length. It will be understood, however, that the diameter at open end 33b must still be greater than that of shank means 21.

In all forms of lug means 22, skirt means 29 can be compressed to a diameter smaller than the diameter of shank means 21 so that an "extraction tool" may be employed to remove fastener 20 from workpiece 40. Of course, the outside diameter of the extraction tool must be less than or equal to the diameter of shank means 21 or less than the clearance hole. This feature permits fastener 20 to be utilized for temporary applications where removal of fastener 20 must be effected without damaging workpiece 40.

The dimensions presented in Tables 1 and 2 below represent the critical dimensions and tolerances thereof which were discussed heretofore in accordance with lug means 22 shown in FIGS. 3-10. The dimensions referred to below are clearly depicted and labeled in FIGS. 9-10 which shows lug means 22b with four movable sections 30b and where: A represents the smallest outside diameter of lug means 22a; B represents the largest outside diameter of lug means 22a, C represents the length of lug means 22a; D represents the length of the skirt means between closed end 28 and slots 31b; E represents the width of slots 31b; and F represents the thickness of the lug means 22b; G represents the diameter of opening 27b; R represents the radius; and R1 represents the radius of curvature at the upper end of lug means 22.

TABLE NO. 1

| NOMINAL | A | | B | | C | |
|---|---|---|---|---|---|---|
| SIZE | MAX | MIN | MAX | MIN | MAX | MIN |
| ⅛ | .105 | .101 | .166 | .156 | .192 | .182 |
| 3/16 | .158 | .154 | .230 | .220 | .214 | .204 |
| ¼ | .210 | .205 | .292 | .282 | .240 | .230 |
| 5/16 | .262 | .257 | .352 | .342 | .256 | .246 |
| ⅜ | .325 | .320 | .417 | .407 | .290 | .280 |
| 7/16 | .378 | .372 | .480 | .470 | .313 | .303 |
| ½ | .430 | .424 | .542 | .532 | .336 | .326 |

TABLE NO. 2

| NOMINAL | D | | E | | F | R | R₁ | G | |
|---|---|---|---|---|---|---|---|---|---|
| SIZE | MAX | MIN | MAX | MIN | | REF | ±.005 | MAX | MIN |
| ⅛ | .030 | .020 | .031 | .026 | .005 | .0485 | .010 | .072 | .067 |
| 3/16 | .046 | .036 | .046 | .041 | .010 | .0745 | .020 | .120 | .115 |
| ¼ | .062 | .052 | .062 | .057 | .015 | .099 | .030 | .135 | .130 |

TABLE NO. 2-continued

| NOMINAL SIZE | D MAX | D MIN | E MAX | E MIN | F | R REF | R₁ ±.005 | G MAX | G MIN |
|---|---|---|---|---|---|---|---|---|---|
| 5/16 | .077 | .067 | .078 | .068 | .020 | .124 | .040 | .156 | .148 |
| ⅜ | .096 | .086 | .094 | .084 | .020 | .154 | .040 | .215 | .203 |
| 7/16 | .112 | .102 | .109 | .099 | .025 | .1975 | .050 | .219 | .208 |
| ½ | .128 | .118 | .125 | .115 | .30 | .2045 | .060 | .240 | .230 |

It should be noted that the above dimensions are merely exemplary and a departure therefrom to meet the certain requirements of any particular application is entirely consistent with the spirit and scope of the present invention. Those skilled in the art will readily recognize that the nominal sizes referred to in Tables Nos. 1 and 2 are used only for illustration and that these nominal sizes may be smaller, larger, or in between those shown in these Tables without departing from the spirit and scope of the present invention.

Tables 3 and 4 illustrate the critical dimensions and tolerances thereof relating to shank means 21 of a modified standard commercial rivet as discussed heretofore. The dimensions referred to in Tables 3 and 4 below are clearly depicted and labeled in FIG. 1A which shows shank means 21 without lug means 22 attached thereto and where: DIA. represents the diameter of shank means 22; H represents the diameter of fixed shoulder 34; J represents the height of fixed shoulder 34; K represents the length of tenon 25; L represents the diameter of tenon 25; M represents the length of pilot 26; and I represents the diameter of pilot 26.

TABLE NO. 3

| NOMINAL SIZE | DIA. MAX | DIA. MIN | H MAX | H MIN | J MAX | J MIN |
|---|---|---|---|---|---|---|
| ⅛" | .125 | .121 | .235 | .215 | .100 | .088 |
| 3/16" | .188 | .182 | .348 | .322 | .147 | .133 |
| ¼" | .250 | .244 | .460 | .430 | .196 | .180 |
| 5/16" | .310 | .304 | .572 | .538 | .243 | .225 |
| ⅜" | .375 | .365 | .684 | .646 | .291 | .271 |
| 7/16" | .435 | .428 | .798 | .754 | .339 | .317 |
| ½" | .500 | .493 | .910 | .860 | .386 | .364 |

TABLE NO. 4

| NOMINAL SIZE | K MAX | K MIN | L MAX | L MIN | M +.003 −.000 | I +.003 −.000 |
|---|---|---|---|---|---|---|
| ⅛ | .231 | .221 | .101 | .097 | .047 | .063 |
| 3/16 | .257 | .247 | .154 | .149 | .063 | .107 |
| ¼ | .288 | .278 | .205 | .198 | .094 | .125 |
| 5/16 | .308 | .298 | .257 | .248 | .109 | .141 |
| ⅜ | .347 | .337 | .320 | .308 | .109 | .188 |
| 7/16 | .375 | .365 | .372 | .359 | .125 | .203 |
| ½ | .402 | .392 | .424 | .409 | .156 | .219 |

Those skilled in the art will readily recognize that the nominal sizes referred to in Table Nos. 3 and 4 are used for illutration and that these nominal sizes may be smaller, larger, or in between those shown in these Tables without departing from the scope of the present invention.

A close analysis off the dimensions shown in Tables 1-4 reveals the relationship between the various parameters and their importance in the practice of the present invention.

It shall be appreciated that all forms of the lug means described heretofore can be employed in conjunction with standard solid shaft fastener devices such as threaded bolts, rivets, studs, and pins in accordance with the present invention that have had at least one end formed into a tenon and pilot structure on which the lug means is operatively connectable. Of course, the critical dimensions of the lug means must be determined in relation to the diameter of the standard solid shaft fastener being used.

FIGS. 13 and 14 show fastener 20, of FIGS. 1-6 being inserted into assembled position through sized openings 41 in workpiece 40 which is comprised of two plates 40a and 40b.

As shown in FIG. 13, movable sections 30 are compressed as fastener 20 is urged through sized openings 41. This action is accomplished by merely applying a sufficient force along the longitudinal axis of shank means 21. Walls 42 of openings 41 continue to compress the truncated core like configuration until lug means 22 exits openings 41 whereupon movable sections 30 return to their outwardly extended position by virtue of the truncated cone design and the resilient material used to make lug means 22. FIG. 14 illustrates fastener 20 in assembled position where plates 40a and 40b are locked, positioned, or entrapped by the fastener.

DESCRIPTION OF SECOND EMBODIMENT

In a second embodiment of the retractable, reusable, and self-locking fastening device in accordance with the present invention, shank means 21' is threaded inwardly of tenon means 25' for mated engagement with nut means 44. FIG. 11 shows shank means 21' having male threads 43 formed on shank means 21' inwardly of tenon 25', and nut means 44 having female threads 45 which correspond to said male threads 43 in pitch, threads per inch, and all other relevant parameters.

In this embodiment, lug means 22' prevents nut means 44 from turning off shank mens 21', thus replacing snap or bearing rings, cotter pins or the wire hole drilling of nut means 44.

Once lug means 22' is fixed on the tenon and pilot structure in the manner described in the first embodiment, the fastening device shown in FIG. 11 is inserted and forced through opening 41 until fixed shoulder 34' abuts workpiece 40. Nut means 44 is then pressed over lug means 22' and threaded onto shank means 21' by virtue of threads 45.

Referring to FIG. 16, it can be seen that lug means 22' retains nut means 44 on shank means 21' by virtue of skirt means 29' which will annularly engage nut means 44. As shown in FIG. 15a, a fastener 20' made in accordance with this embodiment of FIG. 16 can be welded or otherwise affixed to a plate as described in the first embodiment.

Thus, the present embodiment is extrememly advantageous in applications realizing a substantial amount of shock or vibration.

It shall be recognized that the minor diameter of nut means 44 is critical in determining the dimensions of lug means 22' such as diameter and resiliency.

It will be appreciated that the present invention not only provides for the threaded arrangement discussed above, but contemplates the use of any adjustable securing member which is disposed on shank means 21' to securely engage a workpiece 40 and is susceptible to "backing off" due to shock, vibration or other casual factor.

DESCRIPTION OF THIRD EMBODIMENT

A double ended fastening device in accordance with the present invention is shown in this embodiment at FIG. 12 in which shank means 21" includes at both ends tenon means 25", pilot means 26", and lug means 22" disposed and operative in respect of each other in the same manner as described and operative in respect of each other in the same manner as described in the earlier forms of the present invention. Inwardly of each of the respective tenons 25" the shank means 21" is threaded as at 43a and 43b. It is important to note that the arrangement and interrelationship between these elements remains the same as was discussed in the first embodiment, and thus, tenon means 25" and pilot means 26" are formed by the same turning or cold-forming operation, and lug means 22" is affixed to pilot means 26" in the same manner as discussed above.

In FIG. 12 the threaded portions 43a and 43b are disposed for engagement by the threaded portions 45a and 45b of coacting nuts 44a and 44b which are operatively associated with the lug means 22" at each of the respective ends of the shank means 21" as described for the second embodiment of the invention as shown in FIG. 11 of the drawings.

Thus, a simply structured retractable and reusable self-locking fastener for use in a variety of fastening applications in an industrial, commercial, or other setting has been described.

It will be understood that the present invention is not to be limited to the specific structure or embodiments shown and described but that the same may be modified within the spirit and scope of the invention as defined by the claims which follow immediately below.

What is claimed is:

1. A threaded fastener comprising a shank having an outer end portion with the outer periphery of the end portion being threaded for a fastening device having a threaded opening to be threaded onto said shank, a tenon extending axially and outwardly from said end portion of said shank, a lug symmetrical about the axis of said tenon and comprising a base fixed to said tenon outwardly of said shank end portion and a skirt extending inwardly from said base at an abrupt angle thereto toward said shank, said base extending radially of said tenon and being circumscribed by a circle having a radius smaller than the radius of the inside thread diameter of said thread shank portion to allow the device to be threaded onto the shank to be moved over the base, said skirt having slots therein opening into the inner end of said skirt for providing a plurality of yieldable collapsible spring sections which are disposed symmetrically around said tenon and which extend lengthwise along said tenon to terminate adjacent to but axially and outwardly of the outer end of said threaded shank portion to position the ends of said spring sections to act on a device threaded onto the shank for blocking the device from moving off the threaded shank portion, said spring sections being yieldably collapsible about said tenon to a diameter less than the inside diameter of the threads on said threaded shaft portion with said lug having a maximum diameter less than the inside thread diameter of the threaded fastening device to be moved onto and off the shank over said lug.

2. A threaded fastener as defined in claim 1 in which said shank has a second threaded end portion at its other end extending outwardly of the other end of the work hole with the outer periphery of the second end portion being threaded for a fastening device having a threaded opening to be threaded onto said second end portion, and wherein a second tenon extends axially outwardly from said second threaded end portion of said shank, a second lug symmetrical about the axis of said second tenon is mounted on said second tenon and comprises a base fixed to said second tenon outwardly from said shank at a predetermined distance substantially equal to but less than the overall length of the lug, and a skirt extending inwardly from the base at an abrupt angle thereto toward said shank, the base of said second lug extending radially of the tenon and being circumscribed by a circle having a radius smaller than the inside diameter of said second threaded portion to allow the threaded fastening device to be moved over the base nd threaded onto the shank, said skirt of said second lug having slots opening into the inner end thereof for providing a plurality of yieldable collapsible spring sections which are disposed symmetrically around said second tenon and which extend lengthwise along the tenon to terminate adjacent to but outwardly of said shank to position the ends of the sections to engage a device threaded onto the shank at locations adjacent to the shank for blocking the device from being threaded off the shank, said spring sections of the second lug being yieldably collapsible about said second tenon to a diameter less than said shank to allow a fastening device to be threaded onto and off the shank over the skirt and base of the second lug.

3. A threaded fastener as defined in claim 1 in which said skirt has slots opening into the inner end of the skirt adjacent said shank to provide a plurality of spring sections yieldably collapsible around the tenon to define a substantially cylindrically shaped skirt portion of a diameter less than said shank extending coaxially about said tenon.

4. A threaded fastener as defined in claim 2 in which said slots provide skirts yieldably collapsible around the tenons to define a substantially cylindrically shaped skirt portion of a diameter less than said shank which extends coaxially about said tenon.

5. A retractable and reusable self-locking fastener for operative association with a sized clearance hole in a workpiece comprising.
   a. shank means having a predetermined diameter to fit the sized clearance hole in the workpiece, tenon means formed at one end of the shank and pilot means formed on said tenon;
   b. said tenon means having a predetermined sized diameter less than the diameter of the shank means;
   c. lug means made of a strong resilient material, and having a normally tapered cup shape closed at the end with the smallest diameter;
   d. said lug means defining a space into which the tenon means fits in assembled position;
   e. said lug means having an opening in the closed end for communication with the pilot means so as to permit said lug means to be guidedly and operatively mounted on the tenon means, and skirt means at the end remote from the closed end;
   f. means for axially connecting the lug means to the pilot means so as to fix said lug means in assembled position;

g. said lug means having spaced longitudinal slots in the skirt means to define at least four outwardly extending movable sections;

h. said spaced longitudinal slots having sides tapered towards each other in the direction of the closed end of the lug means to facilitate in compressing the movable sections when retracting the self-locking fastener;

i. said lug means having at its closed end an outside diameter less than the diameter of the shank means, and at the end remote therefrom an outside diameter normally greater than the diameter of the shank means; and j. said lug means operative to permit the movable sections thereon to compress during insertion through the sized hole in the workpiece, to expand after the lug means exits the sized hole in the workpiece, and to engage the workpiece so as to lock the fastener in assembled position, said shank means being threaded inwardly of the tenon means for matingly receiving nut means to facilitate in securing a workpiece on said shank inwardly of said nut means.

6. A retractable and reusable self-locking fastener for operative association with a sized clearance hole in a workpiece comprising, a. shank means having a predetermined diameter to fit the sized clearance hole in the workpiece, first and second tenon means formed at the respective ends of the shank means, and first and second pilot means formed on the respective tenon means;

b. said first and second tenon means having a predetermined sized diameter less than the diameter of the shank means;

c. first and second lug means made of a strong resilient material, and having, respectively, normally tapered cup shapes closed at the ends having the smallest diameters;

d. said first and second lug means defining spaces into which the respective tenon means fit in assembled position;

e. said first and second lug means having openings in the closed ends for communication with the pilot means so as to permit the respective lug means to be guidedly and operatively mounted on the respective pilot means, and skirt means at the ends remote from the closed ends;

f. means for axially and fixedly connecting the respective lug means to the respective pilot means;

g. said first and second lug means having spaced longitudinal slots in the skirt means to define at least four outwardly extending movable sections on each respective lug means;

h. said spaced longitudinal slots on the respective first and second lug means tapered in the direction of the closed end of the lug means to facilitate in compressing the movable sections of at least one of the lug means when retracting the self-locking fastener;

i. said first and second lug means having at their closed ends outside diameters less than the diameter of the shank means, and at the end remote therefrom outside diameters greater than the diameter of the shank means; and j. said first and second lug means operative to permit the movable sections thereon to compress during insertion through the sized clearance hole in the workpiece, to expand after the respective lug means exits the sized clearance hole in the workpiece, and to engage the workpiece so as to lock the fastener in assembled position, at least one end of the shank means being threaded inwardly of the tenon means for matingly receiving nut means to facilitate in securing a workpiece on said shank inwardly of the nut means.

7. A metal fastener for telescopic association with a nominal size work hole extending through a work comprising one or more parts to be secured, the hole being of predetermined length and diameter to receive a fastener shank of the same nominal size as the work hole with the shank having a diameter which approximates but is less than the diameter of the work hole, the work hole having entering and exiting ends for the fastener and laterally extending work surfaces around each end engagable by the fastener, said fastener comprising a nominal size cylindrical shank to be received in a work hole of the same nominal size, said shank having a diameter approximating but less than the diameter of the work hole, a work engaging element fixed on one end of said shank, said element extending laterally of the shank to engage the work surface adjacent the work hole at the entering end of the work hole, said shank having a reduced diameter portion spaced axially from said work engaging element providing a shoulder adjacent the exit end of the hole but inwardly thereof, and a tenon extending axially away from the shoulder outwardly from the exit end of the work hole, a lug of spring metal having a predetermined length fixed on said tenon at a predetermined distance from said work engaging element to position the inner end of the lug facing said element at a distance from said element substantially equal to the predetermined length of the work hole, said lug being cup shaped and coaxially disposed on said tenon and having a base portion extending outwardly and substantially radially of said tenon and having an outside dimension less than the diameter of the shank, and a skirt portion extending inwardly toward said shank from the outer peripheral portion of said base at an abrupt angle to said base, said skirt portion tapering outwardly from the tenon to define a circle at its inner end adjacent the work slightly larger than the predetermined diameter of the work hole to provide for the engagement of the inner of said skirt with the work surface adjacent to the exit end of the work hole to preclude retraction movement of the fastener, said skirt having slots opening into the inner end of the skirt to provide a plurality of spring sections yieldably collapsible around the tenon to define a substantially cylindrically shaped skirt portion of a diameter less than said shank extending coaxially about said tenon for passage through the work hole, and said skirt sections expanding upon clearing the exit end of the hole to their uncollapsed condition for engaging the work adjacent to the hole at the exit end of the work hole.

8. A fastener as defined in claim 7 wherein said slots terminate short of said base and the skirt has a continuous wall portion between the slots and the base.

9. A fastener as defined in claim 7 in which said tenon has a pilot portion of reduced diameter extending axially therefrom and said base has a central opening cooperating with said pilot portion to position said lug coaxially with the axis of said shank.

10. A fastener as defined in claim 7 wherein said base has a maximum outside dimension less than said shank to provide a sufficient clearance for a retraction tool for collapsing said skirt to its generally cylindrical configuration.

11. A fastener as defined in claim 10 wherein said slots terminate short of said base and the skirt has a continuous wall portion between the slots and the base.

12. A fastener as defined in claim 10 in which said tenon has a pilot portion of reduced diameter extending axially therefrom and said base has a central opening cooperating with said pilot portion to position said lug coaxially with the axis of said shank.

13. A fastener as defined in claim 11 in which said tenon has a pilot portion of reduced diameter extending axially therefrom and said base has a central opening cooperating with said pilot portion to position said lug coaxially with the axis of said shank.

14. A family of fasteners having the same nominal diameter for use in a work or works having work holes of the same nominal diameter but of different lengths, each fastener comprising a fastener of the nominal diameter for telescopic association with a work hole for that nominal diameter fastener, the hole being of predetermined length and diameter to receive the nominally sized fastener and having entering and exiting ends for the fastener and exterior work surfaces around each end engagable by the fastener, said fastener comprising a cylindrical shank, said shank having a diameter approximating but less than the predetermined diameter of the work hole, a work engaging element fixed on one end of said shank, said element extending laterally of the shank to engage the work surface adjacent the work hole at the entering end of the work hole, said shank having a reduced diameter portion spaced axially from said element providing a shoulder adjacent the exit end of the hole but inwardly thereof and a tenon extending axially away from the shoulder and outwardly from the exit end of said work hole coaxially with said shank, a lug of spring metal having a predetermined length fixed on said tenon to position the inner end of the lug facing said element a predetermined distance from said element which is approximately equal to the predetermined length of the work hole, said lug being cup shaped and coaxially disposed on said tenon and having a base portion extending substantially radially of said tenon with an outside dimension less than the diameter of the shank, and a skirt portion extending inwardly toward said shank from the outer peripheral portion of said base at an abrupt angle to said base, said skirt tapering outwardly from the tenon to define a circle at its inner end adjacent the work slightly larger than the predetermined diameter of the work hole to provide for the engagement of the inner end of said skirt with the work surface adjacent to the exit end of the work hole to preclude retraction movement of the fastener, said skirt having slots opening into the end of the skirt to provide a plurality of spring sections yieldably collapsible around the tenon to define a substantially cylindrically shaped skirt portion of a diameter less than said shank extending coaxially about said tenon for passage though the work hole, said skirt sections expanding upon clearing the exit end of the hole to their uncollapsed condition for engaging the work adjacent to the hole at the exit end of the work hole, the length of the shank of the fastener varying for different length work holes for the same nominal size fastener to compensate for the length of the work hole with the dimensiins of said tenon and lug means remaining the same.

15. A family of fasteners as defined in claim 14 wherein said slots terminate short of said base and the skirt has a continuous wall portion between the slots and the base.

16. A family of fasteners as defined in claim 14 in which said tenon has a pilot portion of reduced diameter extending axially therefrom and said base has a central opening cooperating with said pilot portion to position said lug coaxially with the axis of said shank.

17. A family of fasteners as defined in claim 14 wherein said base has a maximum outside diameter less than said shank to provide clearance for a retraction tool for collapsing said skirt to its generally cylindrical configuration.

18. A family of fasteners as defined in claim 17 wherein said slots terminate short of said base and the skirt has a continuous wall portion between the slots and the base.

19. A family of fasteners as defined in claim 17 in which said tenon has a pilot portion of reduced diameter extending axially therefrom and said base has a central opening cooperating with said pilot portion to position said lug coaxially with the axis of said shank.

* * * * *